United States Patent [19]

van Alem et al.

[11] Patent Number: 5,399,952
[45] Date of Patent: Mar. 21, 1995

[54] ELECTROMAGNETIC DRIVE SYSTEM WITH INTEGRAL POSITION DETECTOR

[75] Inventors: Antonius M. van Alem; Peter H. de la Rambelje, both of Eindhoven, Netherlands

[73] Assignee: U. S. Philips Corporation, New York, N.Y.

[21] Appl. No.: 686,904

[22] Filed: Apr. 17, 1991

[30] Foreign Application Priority Data

May 14, 1990 [NL] Netherlands ............... 9001126

[51] Int. Cl.⁶ ............................................. G05B 1/06
[52] U.S. Cl. ................................. 318/652; 318/653; 318/687
[58] Field of Search .............. 318/652, 653, 662, 650, 318/687; 310/197, 196; 361/152, 210; 324/207.24, 207.15, 207.16

[56] References Cited

U.S. PATENT DOCUMENTS

| 3,870,931 | 3/1975 | Myers ................ 318/599 X |
| 4,363,980 | 12/1982 | Peterson ................ 310/15 |
| 4,616,153 | 10/1986 | Lee ................ 318/687 |
| 4,652,820 | 3/1987 | Maresca ................ 324/207 |
| 4,853,604 | 8/1989 | McMullin et al. ................ 318/653 |
| 5,025,213 | 6/1991 | Dobler et al. ................ 324/207.12 |

FOREIGN PATENT DOCUMENTS 2183277  4/1986  European Pat. Off. .
60-183960  9/1985  Japan .
2084408  4/1982  United Kingdom .

Primary Examiner—William M. Shoop, Jr.
Assistant Examiner—Brian Sircus
Attorney, Agent, or Firm—Edward Blocker; Bernard Franzblau

[57] ABSTRACT

An electromagnetic drive system includes a motor having a first motor section movable relative to a second motor section along a motion axis. The second motor section has three excitation coils. The first motor section includes a magnetic circuit generating a magnetic field in the excitation coils. The first motor section also includes a short-circuit winding for only high-frequency induction currents. This short-circuit winding is magnetically coupled to the excitation coils. The degree of electromagnetic coupling of at least one excitation coil depends on the position of the first motor section relative to the second motor section. The short-circuit winding provides a position-dependent electromagnetic coupling between the center excitation coil and the two outer excitation coils. The position-dependent coupling can be detected by superimposing a high-frequency detection signal on the excitation system for the center coil and by detecting currents induced in the two outer coils by the high-frequency detection signal. Thus, a compact drive system with a built-in position detector is obtained.

27 Claims, 2 Drawing Sheets

1

ELECTROMAGNETIC DRIVE SYSTEM WITH INTEGRAL POSITION DETECTOR

BACKGROUND OF THE INVENTION

This invention relates to an electromagnetic drive system comprising an electromotor of which a first motor section is disposed movably relative to a second motor section, the second motor section comprising a first coil and the first motor section comprising a magnetic circuit for generating a magnetic field in the first coil, one of the motor sections comprising a short-circuit winding having an electromagnetic coupling to at least two coils of the other motor section, the electromagnetic coupling between the short-circuit winding and at least one of the latter coils being dependent on the position of the first motor section relative to the second motor section.

A drive system of this type is known from U.S. Pat. No. 4,616,153. In the prior-art drive system the motor sections are constituted by two coaxial cylindrical bodies which are disposed slidably relative to each other. The internal cylindrical body constitutes the first motor section consisting of a tube around which an excitation coil and the short-circuit winding is disposed. The external cylindrical body comprises the magnetic circuit which generates a radially directed magnetic field in the excitation coil. The second motor section further includes two detection coils disposed coaxially relative to the short-circuit winding and having a position-dependent electromagnetic coupling to the short-circuit winding.

By injecting a high-frequency detection signal into the detection coils, the position of the first motor section relative to the second motor section can be derived from the signals across the detection coils. In this manner a motor with a built-in position detector is realised. A disadvantage of the prior art drive system, however, is that the components necessary for position detection take up a relatively large amount of space so that the drive system is less suitable for applications in which it is desired that the motor have very small dimensions, such as, for example, miniatufised portable recording systems such as are used, for example, with an electronic still picture.

SUMMARY OF THE INVENTION

It is an object of the invention to provide a drive system according to the opening paragraph which is more suitable for miniaturisation. According to the invention this object is achieved in that the drive system is characterized in that the short-circuit winding is enclosed by the second motor section and in that a magnetic circuit is arranged so as to generate a magnetic field in the coils which are electromagnetically coupled to the short-circuit winding.

This makes it possible to use the same coils both for exciting the motor and for position detection. This twofold use of the coils means that the coils are used more efficiently, which in turn means that the space required for the coils is smaller. An embodiment of the drive system is characterized in that the second motor section comprises three excitation coils electromagnetically coupled to the short-circuit winding, in that a first and a second coil of the three excitation coils are positioned symmetrically relative to the third coil of the three excitation coils, and in that a magnetic circuit is arranged so as to generate the magnetic field in the three excitation coils.

This embodiment makes it possible to accurately detect the position by means of differential detection. An embodiment of the drive system in which such a differential detector is realised is characterized by an excitation circuit for generating excitation currents in the excitation coils, by a circuit for superposing a high-frequency detection signal on the excitation current of the third excitation coil, and by a detection circuit for deriving a position signal indicative of the position of the first motor section relative to the second motor section as a function of the difference between the signals occurring in the first and second excitation coils and caused by the detection signal.

An embodiment highly attractive for its simplicity and having differential position detection is characterized in that the excitation coils are connected in parallel, the drive system comprising a current source for feeding the parallel connection of excitation coils with an excitation current on which the high-frequency detection signal is superposed, a detection circuit for detecting the currents in the first and second excitation coils and a circuit for deriving the position signal from the difference between these currents.

In this embodiment, the fact that with differential detection the high-frequency detection signal directly injected into the first and second coils by the current source has no effect on the result of the detection is used to advantage. Hence it is possible to feed all three excitation coils from a common current source.

The invention can be applied to both rotary motors and linear motors. An embodiment attractive for its simple structure of a drive system comprising a linear motor is characterized in that the excitation coils are disposed behind each other and are essentially cylindrical with a common axis, the first motor section being cylindrical and disposed slidably within the excitation coils in a direction parallel to the common axis of the excitation coils, and the magnetic circuit being arranged generate radially directed magnetic fields in the excitation coils.

A further embodiment of the drive system is characterized in that the short-circuit winding is formed by a bus of non-magnetically conductive, electronically conductive material, which bus is enclosed by the second motor section and which bus encloses the magnetic circuit.

The use of the bus achieves a twofold object, that is to say, the formation of the short-circuit winding and the enclosure of the magnetic circuit.

An extremely simple structure of the magnetic circuit is obtained in an embodiment characterized in that the magnetic circuit comprises at least two cylindrical permanent magnets disposed behind one another and which have a common axis parallel to the axis of the second motor section. The poles of these magnets are situated at the cylinder extremities and two adjacent cylinder extremities of the magnets have the same polarity.

If the distance between the poles of the cylinder magnets is chosen sufficiently small, a magnetoconductive path in the second motor section is not required in order to generate a sufficiently high magnetic field. Omitting the magnetoconductive path in the second motor section has the additional advantage that there are no adhesive forces between the first and second motor sections, so that a simple journalling of the motor sections will suffice. Although the position detector of the motor can be used for determining the commutation time of electronically commuted brushless d.c. motors, the invention is pre-eminently suitable for use in position servo systems. An embodiment in which this is realised is characterized in that the system comprises a control circuit for controlling the excitation currents in response to the position signal and to a reference signal that indicates the desired position of the first motor section relative to the second motor section.

BRIEF DESCRIPTION OF THE DRAWING

The invention will be further explained with reference to the accompanying drawing in which.

DESCRIPTION OF THE PREFERRED EMBODIMENTS

Figure 1A:
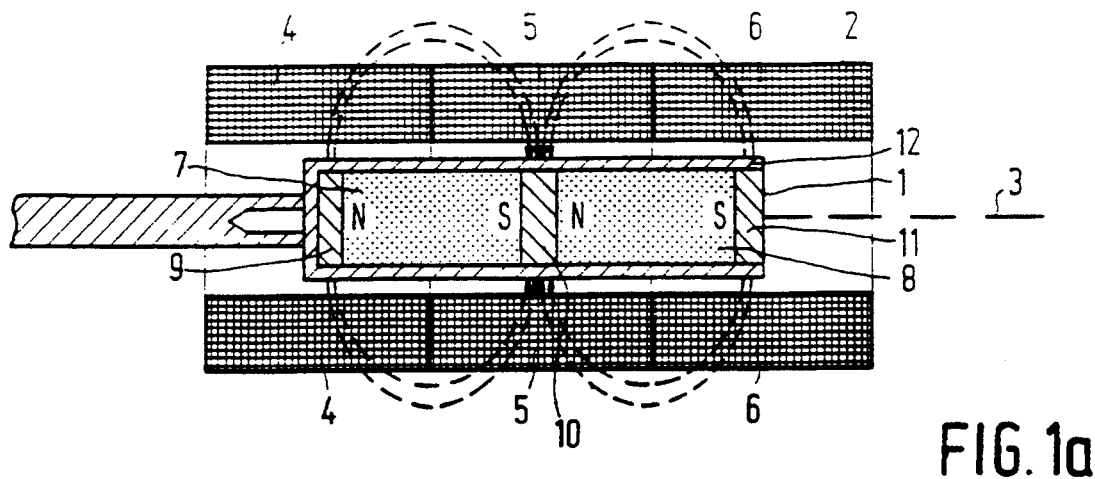
FIGS. 1 to 4 show four embodiments of the drive system according to the invention.
Figure 1B:
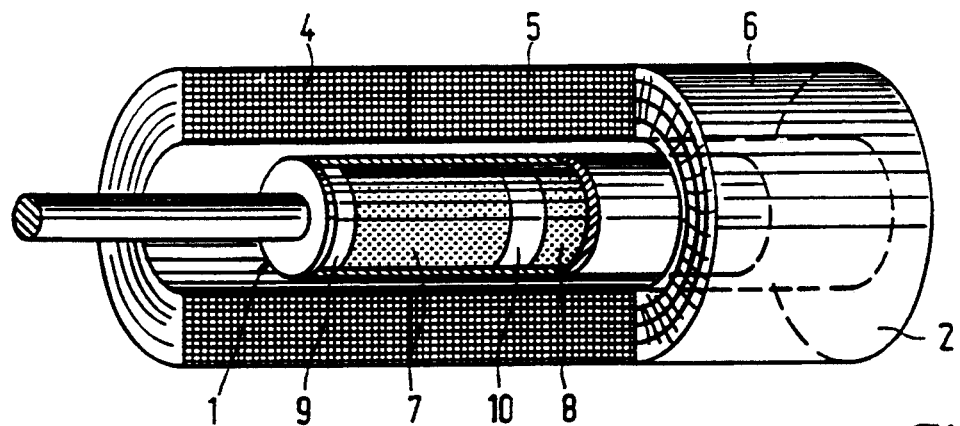

FIG. 1 shows a first embodiment of the drive system according to the invention with FIG. 1a showing a cross-sectional view of the drive system and FIG. 1b showing a perspective, partly cutaway view of the drive system. The embodiment shown relates to a linear motor comprising a first motor section 1 and a second motor section 2 which have the form of two cylindrical bodies with one disposed inside each of the other and movably disposed relative to each other along a motion axis 3. In the embodiments represented here, the motor sections have a circle-cylindrical form. However, cylinder forms having a non-cylindrical cross-section for example, a rectangular cross-section, also are suitable. The second motor section 2 comprises three cylindrical excitation coils disposed behind each other and disposed coaxially relative to the first motor section 1. The first motor section 1 comprises a magnetic circuit for generating a radially directed magnetic field in the coils 4, 5 and 6. Such a magnetic circuit may consist of two cylindrical permanent magnets 7 and 8 disposed behind each other and whose axes coincide with the motion axis 3. At the extremity of the cylinder, magnetic plates 9, 10 and 11 are disposed. The magnetic poles of the magnets 7 and 8 are disposed at the cylinder extremities. The facing poles of the magnets 7 and 8 have the same polarity so that a radially directed magnetic field is generated in the parts of the coils 4, 5 and 6 which are disposed opposite the plates 9, 10 and 11. For illustration, the field lines of the generated magnetic field are represented by means of dashed lines in FIG. 1a. The magnetic circuit is contained in a cylindrical bus 12 of an electrically conductive, magnetically non-conductive material, for example, aluminium, copper or brass. When the excitation coils are excited and the direction of current in the coils 4 and 6 is opposite to the direction of current in coil 5, Lorenz forces will be exerted between the first and second motor sections so that they will move relative to each other. If, in addition, a high-frequency detection current is superposed on the excitation current of coil 5, an a.c. current will be generated in bus 12 because this bus operates as a short-circuit winding electromagnetically coupled to the coil 5. This a.c. current is equally distributed over the bus surface. Since the coils 4 and 6 are also electromagnetically coupled to the bus 12, an alternating voltage will be generated in the coils 4 and 6 as a result of the a.c. current in bus 12. The amplitude of the a.c. voltage is almost directly proportional to the size of the bus surface opposite the coil concerned. This means that the intensity of the generated a.c. voltage is indicative of the position of the first motor section 1 relative to the second motor section 2. From the a.c. voltages generated in the coils, a position signal indicative of the position of the first motor section relative to the second motor section can then be derived in an extremely simple fashion.

Figure 2:
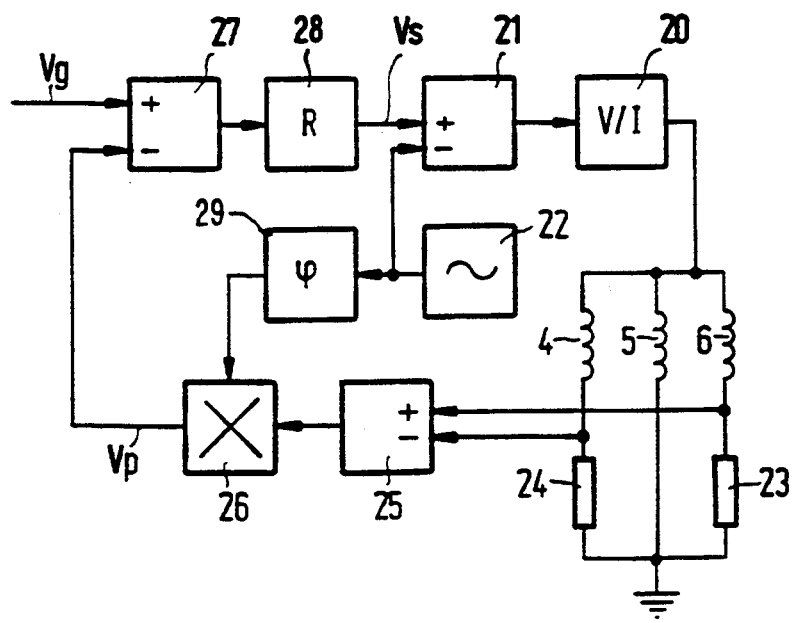

An embodiment of a drive system in which the position signal is derived in an extremely simple fashion is represented in FIG. 2. In this Figure the excitation coils 4, 5 and 6 are connected in parallel and are excited from a single voltage-to-current converter 20 with an excitation current on which the high-frequency detection signal is superimposed. An adder circuit 21, by means of which a high-frequency voltage originating from an oscillator 22 is added to a control voltage Vs indicative of the desired excitation current, is used for superposing the high frequency detection signal. The voltage signal of the adder circuit 21 is applied to an input of the voltage-to-current converter 20 that converts the voltage signal into the excitation current and applies this current to the parallel circuit of the excitation coils 4, 5 and 6. The currents through the coils 4 and 6 are detected by means of respective current detectors 24 and 23. By means of a differential amplifier 25 the difference between the two detected currents is determined. Owing to the symmetrical positions of the coils 4 and 6 relative to coil 5 the difference between the two detected currents merely comprises an a.c. current component indicative of the position of the first motor section 1 relative to the second motor section 2. In this respect the amplitude of the differential current component indicates the motor position deviation from a central position, which central position corresponds with the position in which the bus surface situated opposite coil 4 is equal to the bus surface situated opposite coil 6. The phase of the differential current component indicates the direction of the deviation. A position signal indicating both the direction and magnitude of the position can therefore be easily obtained by means of a synchronous detector 26 to which a difference signal supplied by the differential amplifier 25 and a high-frequency signal supplied by the oscillator 22 via the phase shifter 29 can be applied. The position signal Vp can be tapped from the output of the synchronous detector 26. In the case where in the operating range of the motor the electromagnetic coupling between the short-circuit winding 12 and the central coil 5 is independent of the mutual position of the two motor sections and the degree of electromagnetic coupling between the outermost motor coils 4 and 6, and the short-circuit winding has a linear relation to the mutual shift of the motor sections, the relation between the amplitude of the position signal Vp and the position of the motor sections relative to each other is substantially linear, so that the position signal is readily suitable as a position detector signal in a position servo system for controlling the relative positions of the motor sections. In this respect, in a differential amplifier 27 the position signal Vp can be compared to a signal Vg that indicates the desired position. An output signal of the differential amplifier 27, which is indicative of the difference found, is applied to a control circuit 28 deriving the signal Vs as a function of this signal so that the difference between the desired position and the actual position is kept almost equal to zero.

In the embodiment described hereinbefore, the bus 12 becomes a short-circuit winding. Such a short-circuit winding may also be formed, however, by means of a cylindrical coil wound around the first motor section. Since the robustness of the motor construction is enhanced as a result of a short-circuit winding in the form of a bus, the latter is to be preferred.

It should further be observed that the invention is not restricted to drive systems comprising three excitation coils. The invention is likewise applicable to embodiments in which two excitation coils or more than three excitation coils are electromagnetically coupled to the short-circuit winding.

Figure 3:
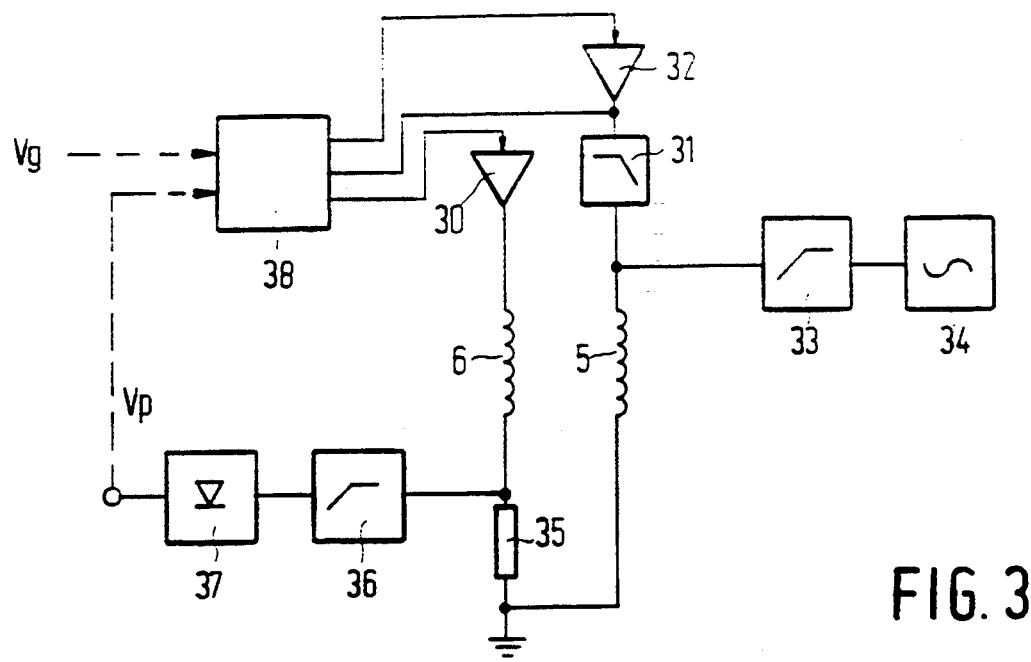

A motor comprising two coils in the second motor section which are electromagnetically coupled to a short-circuit winding in the first motor section may be constituted, for example, by the embodiment shown in FIG. 1, but from which for example, coil 4 and magnet 7 are omitted. Such an embodiment can then comprise an excitation circuit for exciting the coils 5 and 6 and deriving the position signal as indicated in FIG. 3. In this embodiment coil 6 is excited by means of a voltage-to-current converter 30. The coil 5 is excited by means of a voltage-to-current converter 32 through a low-pass filter 31. An oscillator circuit 34 injects a high-frequency detection current into the coil 5 through a high-pass filter 33. The current in coil 6 is detected by means of a current detector 35. The current detector 35 is one of a customary kind producing a signal voltage proportional to the detected current. In a high-pass filter 36 this signal voltage is applied to a rectifier 37

At the output of the high-pass filter 36 an a.c. voltage is produced having an amplitude determined by the degree of electromagnetic coupling between coil 6 and bus 12. Since this coupling depends on the position of the first motor section relative to the second motor section, the amplitude of the a.c. voltage at the output of filter 36 will be indicative of this position. Once this a.c. voltage has been rectified by rectifier 37, a signal whose d.c. voltage level indicates the motor position can be tapped from the output of the rectifier 37. This signal may be used as the position signal Vp. When used in a position servo system this signal Vp, together with a signal Vg, may be applied to a circuit 38 that derives the control voltage for the voltage-to-current converters 30 and 32 from the signals Vg and Vp.

Figure 4:
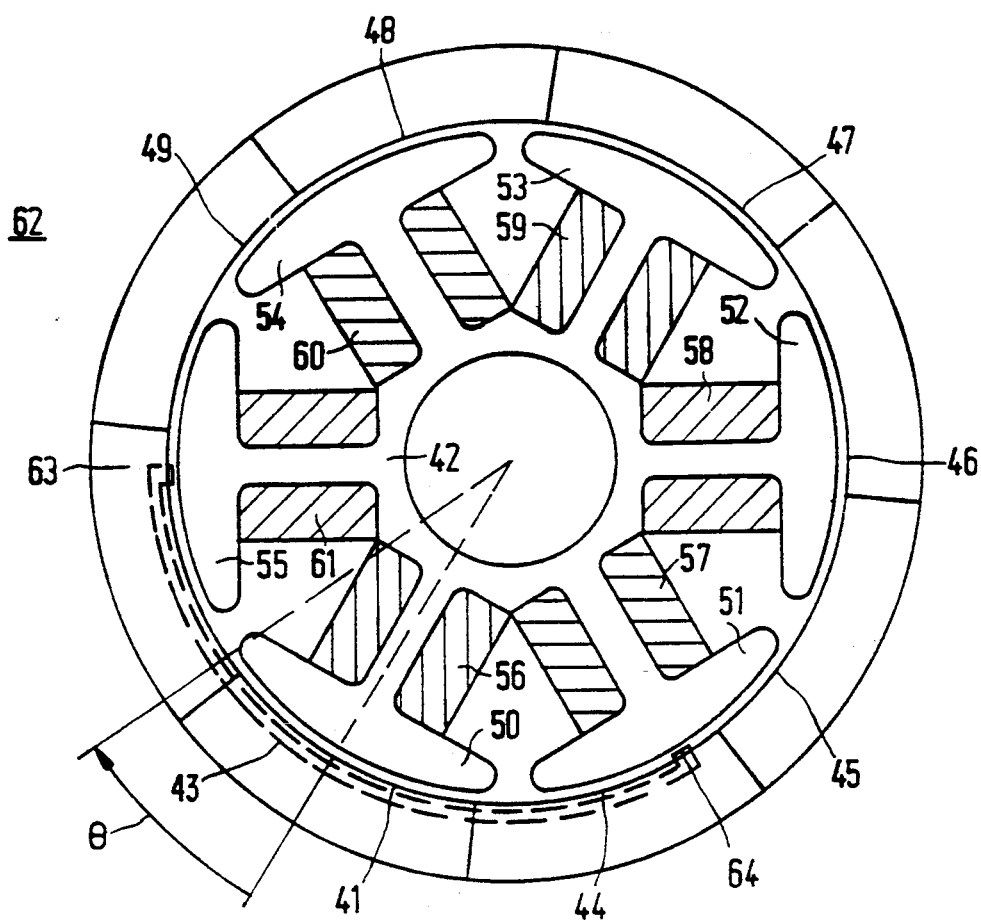

The embodiments of the drive system described hereinbefore are linear motors. However, the invention likewise relates to rotary motors. An embodiment of a drive system in the form of a rotary motor 62 is represented in FIG. 4. The rotary motor 62 comprises a cylindrical rotor 41 of a permanent-magnet material, which rotor is disposed rotatably around a ferromagnefic stator 42. The angle between the rotor 41 and the stator 42 is referenced $\Theta$. The stator 42 comprises six stator teeth 50, . . . , 55 angularly displaced by sixty degrees relative to each other and having shoe-like ends. Opposite the shoe-like ends of the stator teeth 50, . . . , 55 there are four magnetic north poles 42, 45, 47, 49, and four magnetic south poles 44, 46, 48, 63 distributed evenly over the rotor circumference. Stator teeth 50, . . . , 55 form the cores of the respective stator coils 56, . . . , 61. The coils of oppositely disposed stator teeth are connected in series. Opposite the shoe-like ends of the stator teeth 50, 51 and 55 within the rotor 41 a short-circuit winding 64 is disposed which is electromagnetically coupled to one of the coils 56, 57 and 61 and in which within a certain range of the angle $\Theta$ the magnetic coupling between the short-circuit winding 64 and the coil 56 is independent of the angle $\Theta$ and the electromagnetic coupling between the short-circuit winding 64 and the coils 56 and 61 is substantially directly proportional to $\Theta$.

The three sets of series-connected coils of the motor 62 can be excited by means of the circuit shown in FIG. 2. A position signal indicative of this angle can likewise be derived by means of the circuit shown in FIG. 2.

We claim:

1. A system comprising: an electromotor having a first motor section disposed movably relative to a second motor section, the second motor section comprising a first coil and the first motor section comprising a magnetic circuit for generating a magnetic field in the first coil, one of the motor sections comprising a short-circuit winding electromagnetically coupled to at least two coils of the other motor section, the electromagnetic coupling between the short-circuit winding and at least one of the two coils being dependent on the position of the first motor section relative to the second motor section, wherein the short-circuit winding comprises a bus of non-magnetic, electrically conductive material which is enclosed by the second motor section and the magnetic circuit is arranged so as to generate a magnetic field in the coils which are electromagnetically coupled to the short-circuit winding, and wherein the bus encloses the magnetic circuit.

2. A drive system as claimed in claim 1, wherein the other motor section is the second motor section and said first coil and said two coils comprise three excitation coils electromagnetically coupled to the short-circuit winding, in that first and second coils of the three excitation coils are positioned symmetrically relative to a third coil of the three excitation coils, and the magnetic circuit is arranged to generate the magnetic field in the three excitation coils.

3. A drive system as claimed in claim 2, wherein the excitation coils are essentially cylindrical and are disposed in a line and with a common axis, the first motor section being cylindrical and disposed movably within the excitation coils in a direction parallel to the common axis of the excitation coils, and the magnetic circuit is arranged to generate radially directed magnetic fields in the excitation coils.

4. A drive system as claimed in claim 3, wherein the magnetic circuit comprises at least two cylindrical permanent magnets linearly disposed and with a common axis parallel to the common axis of the excitation coils, the poles of said magnets being situated at the cylinder extremities and wherein two adjacent cylinder extremities of the magnets have the same polarity.

5. A drive system as claimed in claim 3, wherein the second motor section provides a non-magnetic path for conducting the magnetic field generated by two opposite poles of the magnetic circuit.

6. A drive system as claimed in claim 3, further comprising an excitation circuit for producing excitation currents in the excitation coils, a circuit for superimposing a high-frequency detection signal on the excitation current of the third excitation coil, and a detection circuit for deriving a position signal which is indicative of the position of the first motor section relative to the second motor section based upon a difference between signals produced in the first and second excitation coils by the detection signal.

7. A drive system as claimed in claim 2, further comprising an excitation circuit for producing excitation currents in the excitation coils, a circuit for superimposing a high-frequency detection signal on the excitation current of the third excitation coil, and a detection circuit for deriving a position signal which is indicative of the position of the first motor section relative to the second motor section upon a difference between signals produced in the first and second excitation coils by the detection signal.

8. A drive system as claimed in claim 2 wherein the excitation coils are connected in parallel, and the drive system further comprises a current source for supplying the parallel circuit of excitation coils with an excitation current on which a high-frequency detection signal is superimposed, a detection circuit for detecting signal currents only in the first and second excitation coils produced by said detection signal, and a circuit for deriving a position signal from a difference between said signal currents.

9. A drive system as claimed in claim 7, which further comprises a control circuit for controlling the excitation currents in response to the position signal and to a reference signal that indicates a desired position of the first motor section relative to the second motor section.

10. An electric motor comprising:
first and second motor sections disposed to move relative to one another and with one motor section positioned within the other motor section, one of said first and second motor sections comprising at least first and second excitation coils having a common axis and the other one of said first and second motor sections comprising a magnetic circuit arranged so as to generate a magnetic field in the first and second excitation coils, one of the first and second motor sections comprising a short-circuit winding element electromagnetically coupled to said first and second excitation coils such that the degree of electromagnetic coupling between the short-circuit winding element and at least one of the first and second excitation coils is dependent on the position of the first motor section relative to that of the second motor section.

11. An electric motor as claimed in claim 10 wherein said second motor section includes the first and second excitation coils which coils are tubular and are disposed linearly with a common axis, said first motor section comprising the magnetic circuit and which includes at least one elongate permanent magnet member located within the excitation coils and having a longitudinal axis parallel to said common axis, and wherein one of said first and second motor sections is movable relative to the other in a direction parallel to said common axis.

12. An electric motor as claimed in claim 10 wherein the short-circuit winding element comprises a single tubular-shaped electrically conductive element which surrounds that one of the motor sections which comprises the magnetic circuit and said first and second excitation coils at least partly surround the tubular-shaped electrically conductive element.

13. An electric motor as claimed in claim 10 wherein the magnetic circuit comprises at least first and second permanent magnets in alignment and having a common axis parallel to the common axis of the first and second excitation coils.

14. An electric motor as claimed in claim 10 wherein the magnetic circuit comprises at least first and second permanent magnets in alignment with adjacent common poles and the short-circuit winding element comprises a tubular-shaped electrically conductive element which surrounds and supports the first and second permanent magnets.

15. An electric motor as claimed in claim 10 wherein said second motor section includes the first and second excitation coils and a third excitation coil and with all three excitation coils electromagnetically coupled to the short-circuit winding element, said first and second excitation coils being positioned symmetrically relative to the third excitation coil, and wherein said magnetic circuit is arranged to generate the magnetic field in all three excitation coils.

16. An electric motor as claimed in claim 15 further comprising, means for producing excitation currents in the excitation coils, means for supplying a high-frequency detection signal to the third excitation coil, and a detection circuit coupled to the first and second excitation coils and responsive to high-frequency signal currents induced in the first and second excitation coils via the short-circuit winding element, said detection circuit deriving a position signal indicative of the position of the first motor section relative to the second motor section based upon the high-frequency signal currents in the first and second excitation coils.

17. A servomotor system comprising: an electric motor as claimed in claim 16, means for supplying to the servomotor system a reference signal indicating a desired position of the first motor section relative to the second motor section, and a control circuit responsive to the reference signal and to the position signal for controlling the excitation currents supplied to the excitation coils.

18. An electric motor as claimed in claim 15 wherein the excitation coils are connected in parallel, said motor further comprising; means for producing excitation current in the excitation coils, means for supplying a high-frequency detection signal to the excitation coils, and a detection circuit coupled to the first and second excitation coils for deriving a position signal directly proportional to the position of the first motor section relative to the second motor section based upon high frequency signal currents induced in the first and second excitation coils via the short-circuit winding element.

19. An electric motor as claimed in claim 10 further comprising, a low pass filter connected in a first series circuit with the first excitation coil, a source of high frequency signal and a high pass filter connected in a second series circuit with the first excitation coil, and a detection circuit including a high pass filter coupled to the second excitation coil so as to derive a position signal indicative of the position of the first motor section relative to the second motor section.

20. An electric motor as claimed in claim 10 wherein said one motor section comprising the first and second excitation coils includes a third excitation coil, said electric motor further comprising; means for supplying excitation currents to the first, second and third excitation coils and a high frequency detection signal to at least one of the excitation coils, and wherein high frequency currents produced in the first and second excitation coils only are used for determining the position of the first motor section relative to that of the second motor section.

21. An electric motor as claimed in claim 10 wherein said one motor section comprising the first and second excitation coils includes a third excitation coil, said electric motor further comprising; means for supplying excitation currents to the first, second and third excitation coils and wherein the third excitation coil is symmetrically positioned between the first and second excitation coils and a high frequency detection signal is supplied only to the third excitation coil, said short-circuit winding element being operative to couple high frequency energy from the third excitation coil to the first and second excitation coils.

22. An electric motor as claimed in claim 10, further comprising:
   means for supplying excitation currents to the first and second excitation coils to produce a further magnetic field,
   wherein said magnetic circuit includes magnet means for generating said magnetic field in the first and second excitation coils independent of the further magnetic field produced by said excitation currents in said first and second excitation coils,
   means for supplying a high-frequency detection signal to at least one of said excitation coils whereby a high frequency current is produced in the short-circuit winding element by electromagnetic coupling to said at least one excitation coil, and
   means coupled to at least one other of said first and second excitation coils for detecting a high frequency signal electromagnetically coupled thereto by said high frequency current in the short-circuit winding element.

23. An electric motor as claimed in claim 10 wherein said one motor section further comprises a third excitation coil with said first and second excitation coils arranged symmetrically relative to the third excitation coil and with all three excitation coils electromagnetically coupled to the short-circuit winding element,
   means for supplying a high-frequency detection signal to all of said excitation coils whereby a high frequency current is produced in the short-circuit winding element by electromagnetic coupling to said excitation coils, and
   means coupled to said first and second excitation coils for detecting a high frequency signal electromagnetically coupled thereto by said high frequency current in the short-circuit winding element.

24. An electric motor as claimed in claim 10 further comprising:
   means for supplying a high-frequency detection signal to at least one of said excitation coils whereby a high frequency current is produced in the short-circuit winding element by electromagnetic coupling to said at least one excitation coil, and
   means coupled to at least one other of said first and second excitation coils for detecting a high frequency signal electromagnetically coupled thereto by said high frequency current in the short-circuit winding element.

25. An electric motor as claimed in claim 10 wherein said one motor section provides a non-magnetic path for the magnetic field generated by said magnetic circuit.

26. An electric motor as claimed in claim 10, further comprising:
   means for supplying AC excitation currents to the first and second excitation coils to produce a further magnetic field,
   wherein said magnetic circuit includes magnet means for generating said magnetic field in the first and second excitation coils independent of the further magnetic field produced by said excitation currents in said first and second excitation coils.

27. An electromechanical drive system comprising:
   an electric motor having a first motor section disposed movably relative to a second motor section,
   the second motor section comprising at least first and second excitation coils and the first motor section comprising a magnetic circuit including magnet means for generating a magnetic field in the first and second excitation coils,
   the first motor section comprising a short-circuit winding electromagnetically coupled to said at least first and second excitation coils of the second motor section,
   the electromagnetic coupling between the short-circuit winding and at least one of the at least first and second excitation coils being dependent on the position of the first motor section relative to the second motor section, wherein
   the short-circuit winding comprises a bus of nonmagnetic, electrically conductive material which is enclosed by the second motor section,
   means for supplying excitation currents to the at least first and second excitation coils, and
   wherein the bus encloses the magnetic circuit.

* * * * *